(12) United States Patent
Issler et al.

(10) Patent No.: US 7,647,863 B2
(45) Date of Patent: Jan. 19, 2010

(54) PISTON PIN BEARING FOR PISTONS OF AN INTERNAL COMBUSTION ENGINE

(75) Inventors: Wolfgang Issler, Schwaikheim (DE); Günter Zugschwert, Tamm (DE)

(73) Assignee: Mahle GmbH, Stuttgart (DE)

( * ) Notice: Subject to any disclaimer, the term of this patent is extended or adjusted under 35 U.S.C. 154(b) by 260 days.

(21) Appl. No.: 10/590,129

(22) PCT Filed: Feb. 18, 2005

(86) PCT No.: PCT/DE2005/000284

§ 371 (c)(1),
(2), (4) Date: May 7, 2007

(87) PCT Pub. No.: WO2005/078321

PCT Pub. Date: Aug. 25, 2005

(65) Prior Publication Data
US 2007/0204746 A1 Sep. 6, 2007

(30) Foreign Application Priority Data
Feb. 18, 2004 (DE) .................... 10 2004 008 097

(51) Int. Cl.
*F16J 1/14* (2006.01)
(52) U.S. Cl. ....................................... 92/187
(58) Field of Classification Search .......... 92/159, 92/187, 216, 219; 29/888.05
See application file for complete search history.

(56) References Cited

U.S. PATENT DOCUMENTS

| | | | |
|---|---|---|---|
| 4,124,010 A | 11/1978 | Fiedler | |
| 6,279,456 B1 * | 8/2001 | Ueshima et al. | 92/187 |
| 2005/0150374 A1 | 7/2005 | Weinkauf et al. | |
| 2006/0042584 A1 | 3/2006 | Zvonkovic | |

FOREIGN PATENT DOCUMENTS

| | | |
|---|---|---|
| DE | 16 50 206 A2 | 8/1970 |
| DE | 21 52 462 B2 | 4/1973 |
| DE | 76 05 527 | 6/1976 |
| DE | 30 36 062 A1 | 4/1982 |

(Continued)

OTHER PUBLICATIONS

International Search Report.

*Primary Examiner*—Michael Leslie
(74) *Attorney, Agent, or Firm*—Collard & Roe, P.C.

(57) ABSTRACT

The invention relates to a piston pin bearing of an internal combustion engine, in which a cylindrical piston pin is mounted. The aim of the invention is to create a hub bore shape that is improved compared to prior art in order to significantly reduce mechanical stress in the piston and thus extend the service life of the piston. Furthermore, the shape is to prevent noise from being generated in the piston pin bearing. The aims are achieved by the fact that the surface line of the highly oval outer surface, which runs in the zenith of the hub, extends at an angle to the hub axis from a radially outward point to a radially inward point on the piston side such that the greatest degree of ovalness defined by the oval diameter thereof is created at the respective inner ends of the hub bores and does not exceed a predefined value of the oval diameter.

9 Claims, 1 Drawing Sheet

FOREIGN PATENT DOCUMENTS

Figure 1:
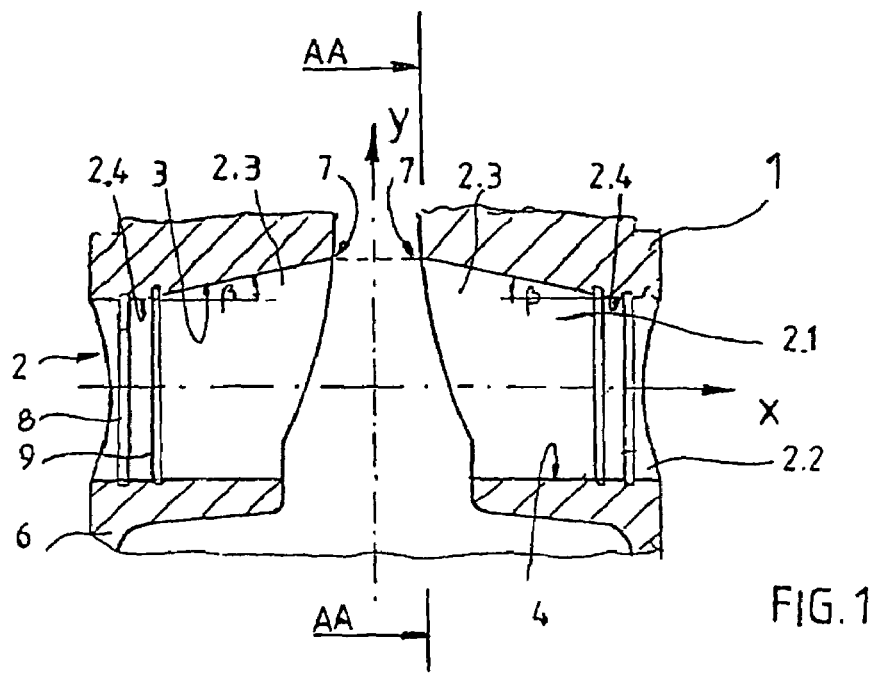

| | | |
|---|---|---|
| DE | 33 01 366 A1 | 7/1984 |
| DE | 41 41 279 A1 | 6/1993 |
| DE | 44 31 990 | 3/1996 |
| DE | 44 41 450 A1 | 5/1996 |
| DE | 102 22 463 A1 | 12/2003 |
| DE | 102 31 233 A2 | 2/2004 |
| JP | 2003 013800 A | 1/2003 |

* cited by examiner

PISTON PIN BEARING FOR PISTONS OF AN INTERNAL COMBUSTION ENGINE

CROSS REFERENCE TO RELATED APPLICATIONS

Applicants claims priority under 35 U.S.C. 119 of German Application No. 10 2004 008 097.6 filed Feb. 18, 2004. Applicants also claim priority under 35 U.S.C. §365 of PCT/DE2005/000284 filed Feb. 18, 2005. The international application under PCT article 21(2) was not published in English.

The invention relates to a piston pin bearing for pistons of an internal combustion engine, having pin bores in which a piston pin is mounted.

It is known, for example from DE 21 52 462 B2, DE 41 41 279 A1, and DE 30 36 062 C2, to configure pin bores for pistons of internal combustion engines so as to withstand stress and deformation. The shapes of the pin boss indicated there result from the general recognition that the gas forces that act on the piston crown are transferred to the piston pin by way of the pin bosses, thereby causing the piston pin to be periodically bent as the result of its rotary movement in the connecting rod. According to the common assumption, this causes stress on the pin bores both in the horizontal and the vertical plane, but particularly in the zenith and nadir of the pin bore, in terms of tension, pressure, and bending. In order to withstand this deformation, DE 21 52 462 B2 proposes a pin boss shape in which the mantle line of the pin bore is bent, the axis of the pin bore has a slightly curved progression towards the center of the piston, and the cross-section of the bore has an oval shape, whereby the small half-axis of the oval runs parallel to the longitudinal axis of the piston.

In DE 30 36 062 C2, it is proposed that the pin bores are configured in oval shape in cross-section, and the great half-axis of the oval runs parallel to the longitudinal axis of the piston. In addition, the side of the pin bores that is at a distance from the longitudinal axis of the piston has a greater ovality, and the side adjacent to the longitudinal axis of the piston has a smaller ovality, whereby in a further embodiment, the mantle line is configured to be inclined in the vertex of the bore.

However, in practice, all of the shapes mentioned above do not prevent cracks from forming in the region of the combustion bowl edge as well as the combustion bowl base after a few hundred hours of operation, with an increasing stress on the piston due to increasing ignition pressures, the cause of which cracks can lie in deformations of piston pin and piston, and from stresses at the critical points that result therefrom. In order to give the piston pins more room for deformations, an oval pin bore is proposed in DE 16 50 206 A2, in which the great axis of the oval comes to lie crosswise to the longitudinal axis of the piston. This is supposed to increase resistance to seizing and reduce noise between piston pin and pin bore, at the same time.

From DE 102 22 463 A1, a high ovality of the pin bore is known, configured on one side, only in the equator-zenith-equator pin boss region, in which the mantle line of the oval that lies in the zenith of the pin bore runs parallel to the pin bore axis. With this, the result is supposed to be achieved that the regions that lie outside the piston axis, in other words lateral regions of the pin bore, are subject to greater stress. This results in a greater moment that reduces the bending of the piston about the pin axis, because of the enlarged lever arm relative to the pin axis. In practical terms, however, it has been shown that while bending of the piston about the pin axis is reduced, it is still unsatisfactory.

It is the task of the invention to indicate a pin bore shape for a piston pin bearing that is improved as compared with the state of the art, which permits a clear reduction of mechanical stresses in the piston and therefore also an extension of the useful piston lifetime. Furthermore, the shape is supposed to avoid noise formation in the piston pin bearing.

According to the invention, this task is accomplished by means of the characterizing features of claim 1.

By means of the high ovality configured on one side, only in the equator-zenith-equator pin boss region, the result is advantageously achieved, on the one hand, that in the case of the embodiment according to the invention, of the highly oval bore, the regions that lie outside of the piston axis, in other words lateral regions of the pin bore, are subjected to much greater stress. This results in a greater moment, because of the enlarged lever arm relative to the pin axis. On the other hand, this effect is improved even further, particularly as compared with DE 102 22 463 A1, in that the mantle line of the highly oval mantle surface that runs in the pin boss zenith runs at an incline relative to the pin boss axis, on the piston side, from radially outside to radially inside, at such an angle that the greatest ovality defined by its oval diameter occurs at the inner ends of the pin bores, in each instance, and does not exceed a predetermined value of the oval diameter. From this, lower tangential stresses occur at the bowl edge and the bowl base of the combustion bowl, as compared with the previous state of the art.

On the other hand, the advantageous result is achieved, as the result of the circular-cylindrical shape that is configured only in the equator-nadir-equator pin boss region, in which the mantle line of the cylinder, which lies in the nadir of the pin bore, no longer runs parallel to the pin bore axis, that the play between piston pin and pin boss is further minimized during a change in contact of the piston pin from the upper pin boss side to the lower pin boss side.

Advantageous further developments are the object of the dependent claims.

Figure 2:
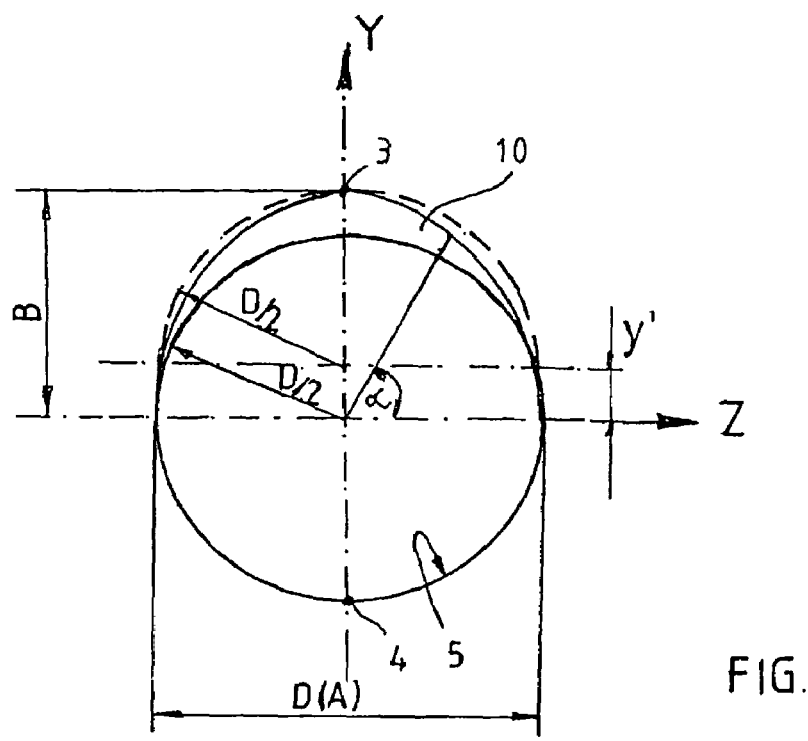
Figure 3:
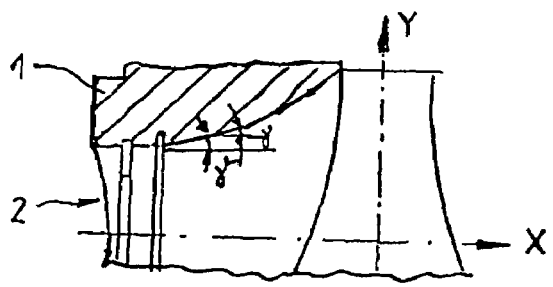

In the following, the invention will be described in greater detail using an exemplary embodiment. The drawing shows:

FIG. 1 a partial longitudinal section through a piston;

FIG. 2 a cross-section through the pin bore, cut along the line A-A;

FIG. 3 a detailed representation of the pin bore according to FIG. 1.

As is evident from FIG. 1, a piston 1 for an internal combustion engine has a pin bore 2 with an upper pin boss region 2.1 and a lower pin boss region 2.2, in which a piston pin in the shape of a circular cylinder (not shown) is mounted. A pin securing nut 8 and an oil groove 9 are disposed on the radially outer end of the pin bore, on the piston side, whereby the oil groove can be configured to run around the circumference of the pin bore, or partially around it. According to FIGS. 1 and 2, the upper pin boss region is disposed on the gas power side, in which the mantle surface of the pin bore 2, designated as 5, has a highly oval shape on the circumference side, along the pin boss axis x, in a partial region 2.3 of the pin boss equator—pin boss zenith—pin boss equator region, and has the shape of a circular cylinder in a partial region 2.4.

The mantle surface having a highly oval shape runs—in cross-section according to the representation in FIG. 2—in a region 10 that is delimited by a half-circle having a pin bore diameter D defined between pin boss equator—pin boss nadir—pin boss equator, and a half-circle having the diameter D, offset in the direction of the pin boss zenith, along the piston axis y, with y'=0.03 percent to 0.5 percent of the defined pin boss diameter D. Preferably, the highly oval mantle surface on one side follows the parameter representation of the oval $$z = A/2 \cos \alpha\}$$

$$y = A/2 \sin \alpha + \tfrac{1}{2}(B-A/2) - \tfrac{1}{2}(B-A/2)\cos(2\alpha) \text{ for } 0° \leq \alpha \leq 180°,$$

where
B great oval half-diameter;
A=D small oval half-diameter;
D diameter of the cylindrical pin boss part;
α angle that is formed by any desired ray relative to the x-axis.

According to FIG. 1, the mantle line 3 of the highly oval mantle surface that runs in the pin boss zenith is inclined, on the piston side, from radially outside to radially inside, at an angle of β, relative to the pin boss axis x, in such a manner that the greatest ovality defined by its oval diameter 2*B occurs at the inner end 7 of the pin bore, in each instance, and does not exceed a predetermined value of the oval diameter. This is established, in the exemplary embodiment, by the value y', defined as the difference between great half-axis of the oval and the circle diameter of the lower, circle-shaped pin boss region 2.2. Since the value y' is determined according to the invention, and the progression of the mantle line 3 along the x axis begins between the pin securing nut 8 and oil groove 9, rising in linear manner from 0 degrees—whereby β equals 0 degrees indicates a parallel progression of the mantle line 3 relative to the x axis of the pin bore—the incline angle β is predetermined accordingly. This angle can decrease according to other embodiments, for example by means of preferred displacement of the beginning of the incline in the direction of the pin securing nut 8. The angle can be determined at $0° \leq \beta \leq 1°$.

Aside from the aforementioned embodiment of a linear incline of the mantle line 3, there is also a polygon-shaped embodiment, i.e. polygonal incline (angle γ) of the mantle line with 2.5 angle minutes incline per polygon segment, in each instance, as indicated in FIG. 3, until the predetermined value of the oval diameter is reached.

For the entire pin bore, it holds true that the mantle lines 4 lying in the nadir runs parallel to the pin boss axis x, which stands perpendicular to the piston axis y. It is practical if the ovality amounts to 0.03 to 0.5% of the pin bore diameter D. In a further exemplary embodiment, not shown, the radial outer pin bore ends can be cambered. Likewise, the radially inner pin bore regions can be configured as a mold bore that does not extend to the radially outer ends of the pin bore 2.

By means of the embodiment according to the invention, the radial stresses in the outer regions of the pin bore are greater, so that—because of the enlarged lever arm relative to the pin axis—a greater moment results, which reduces the bending of the piston about the pin axis. This results in lower tangential stresses at the bowl edge, for example, but also other regions of the combustion bowl are subjected to less stress. In contrast to the invention cited initially, DE 102 22 463 A1, these values are further improved here. In particular, the aforementioned stress reductions at the bowl base, bowl edge in the pin direction (MuRaBoRi) and cooling channel bowl (KüKa) contribute to a great increase in the useful lifetime of the pistons.

REFERENCE SYMBOLS

1 piston
2 pin bore
2.1 upper pin boss region (highly oval)
2.2 lower pin boss region (circular-cylindrical)
2.3 partial region of the pin bore, highly oval
2.4 partial region of the pin bore, not highly oval
3 zenith, mantle line in the zenith
4 nadir, mantle line in the nadir
5 mantle surface of the entire pin bore
6 piston skirt
7 inner end of the pin bore
8 pin securing nut
9 oil groove
10 region
x pin boss axis, equator
y piston axis
z pin boss cross-axis
y' difference between great half-axis of the oval and circle diameter of the lower pin boss region

The invention claimed is:

1. Piston pin bearing for pistons of an internal combustion engine, having pin bores (2) in which a piston pin is mounted, whereby the pin bores have a mantle surface (2.1) having a highly oval shape in extending over a region delimited by the pin boss equator—pin boss zenith—pin boss equator, and a mantle surface (2.2) having a circular-cylindrical shape extending over a region delimited by the pin boss equator—pin boss nadir—pin boss equator, whose mantle lines (3, 4) running in the nadir and the zenith are oriented parallel to one another,
wherein
the mantle line (3) of the highly oval mantle surface running in the pin boss zenith runs at an incline relative to the pin boss axis (X) on the piston side, from radially outside to radially inside, at an angle (b), in such a manner that the greatest ovality defined by its oval diameter occurs at the inner ends (7) of the pin bores, in each instance, and does not exceed a predetermined value of the oval diameter.

2. Piston pin bearing according to claim 1, wherein the incline of the mantle line (3) determined by the angle (b) comprises only a partial region (2.3) of the pin bores (2).

3. Piston pin bearing according to claim 1, wherein the incline of the mantle line (3) determined by the angle (b) runs in linear manner.

4. Piston pin bearing according to claim 1, wherein the incline of the mantle line runs in polygonal manner, with a polygon angle of 2.5 angle minutes, in each instance.

5. Piston pin bearing according to claim 2, wherein the partial region (2.4) of the pin bores (2) that is not configured in highly oval manner is configured as a circular cylinder.

6. Piston pin bearing according to claim 1, wherein the pin bores (2) have molded bore regions.

7. Piston pin bearing according to claim 1, wherein the mantle surface having a highly oval shape is disposed between a region (10) that is delimited by a half-circle having a pin bore diameter (D) defined between pin boss equator—pin boss nadir—pin boss equator, and a half-circle having the diameter (D), offset in the direction of the pin boss zenith, along the piston axis (Y), by 0.03 percent to 0.5 percent of the defined pin boss diameter (D).

8. Piston pin bearing according to claim 7, wherein the offset (Y') amounts to between 0.1 and 0.15 percent of the pin bore diameter.

9. Piston pin bearing according to claim 1, wherein oil grooves, pockets, slots, or oil bores for feeding in lubricant oil are disposed in the pin bores (2).

* * * * *

UNITED STATES PATENT AND TRADEMARK OFFICE
CERTIFICATE OF CORRECTION

PATENT NO. : 7,647,863 B2  Page 1 of 1
APPLICATION NO. : 10/590129
DATED : January 19, 2010
INVENTOR(S) : Issler et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 414 days.

Signed and Sealed this

Sixteenth Day of November, 2010

David J. Kappos
*Director of the United States Patent and Trademark Office*